United States Patent [19]

Ueda et al.

[11] 4,138,035

[45] Feb. 6, 1979

[54] METHOD FOR DISCHARGING HIGH-PRESSURE GAS-OCCLUDING LIQUID AND DEVICE THEREFOR

[75] Inventors: Shigeru Ueda; Kazuo Makino; Yoshinori Nakata; Yoshihisa Hasegawa; Shinichi Yokoyama; Ryoichi Yoshida; Yousuke Maekawa; Yuji Yoshida, all of Sapporo, Japan

[73] Assignee: Agency of Industrial Science & Technology, Tokyo, Japan

[21] Appl. No.: 762,286

[22] Filed: Jan. 25, 1977

[30] Foreign Application Priority Data

Jan. 28, 1976 [JP] Japan .................................. 51/8982

[51] Int. Cl.² .............................................. B67B 7/00
[52] U.S. Cl. ........................................ 222/1; 222/397; 222/263; 222/402.2
[58] Field of Search .............. 222/397, 249, 442, 380, 222/1, 402.2, 263, 335

[56] References Cited

U.S. PATENT DOCUMENTS 2,814,422  11/1957  Mercier ............................ 222/438 X Primary Examiner—Allen N. Knowles
Attorney, Agent, or Firm—Kurt Kelman

[57] ABSTRACT

Discharge of a high-pressure gas-occluding liquid from a pressureproof container holding therein said liquid in a compressed state is effected by a method which comprises connecting said pressureproof container through the medium of a valve to a pressureproof receptacle, allowing the liquid to transfer into said pressureproof receptacle, diminishing the pressure within said pressureproof receptacle for thereby separating the occluded high-pressure gas from the liquid and subsequently releasing the liquid alone from the receptacle. For the purpose of said discharge, there is used a device which comprises a pressureproof container, a pressureproof receptacle and a valve through the medium of which said pressureproof container and said pressureproof receptacle are connected, said pressureproof receptacle being provided in the upper portion thereof with a piston adapted so as to have the motion thereof limited via a valve by means of a spring and in the inner portion thereof with a liquid discharge tube laid past a piston and a valve.

2 Claims, 1 Drawing Figure

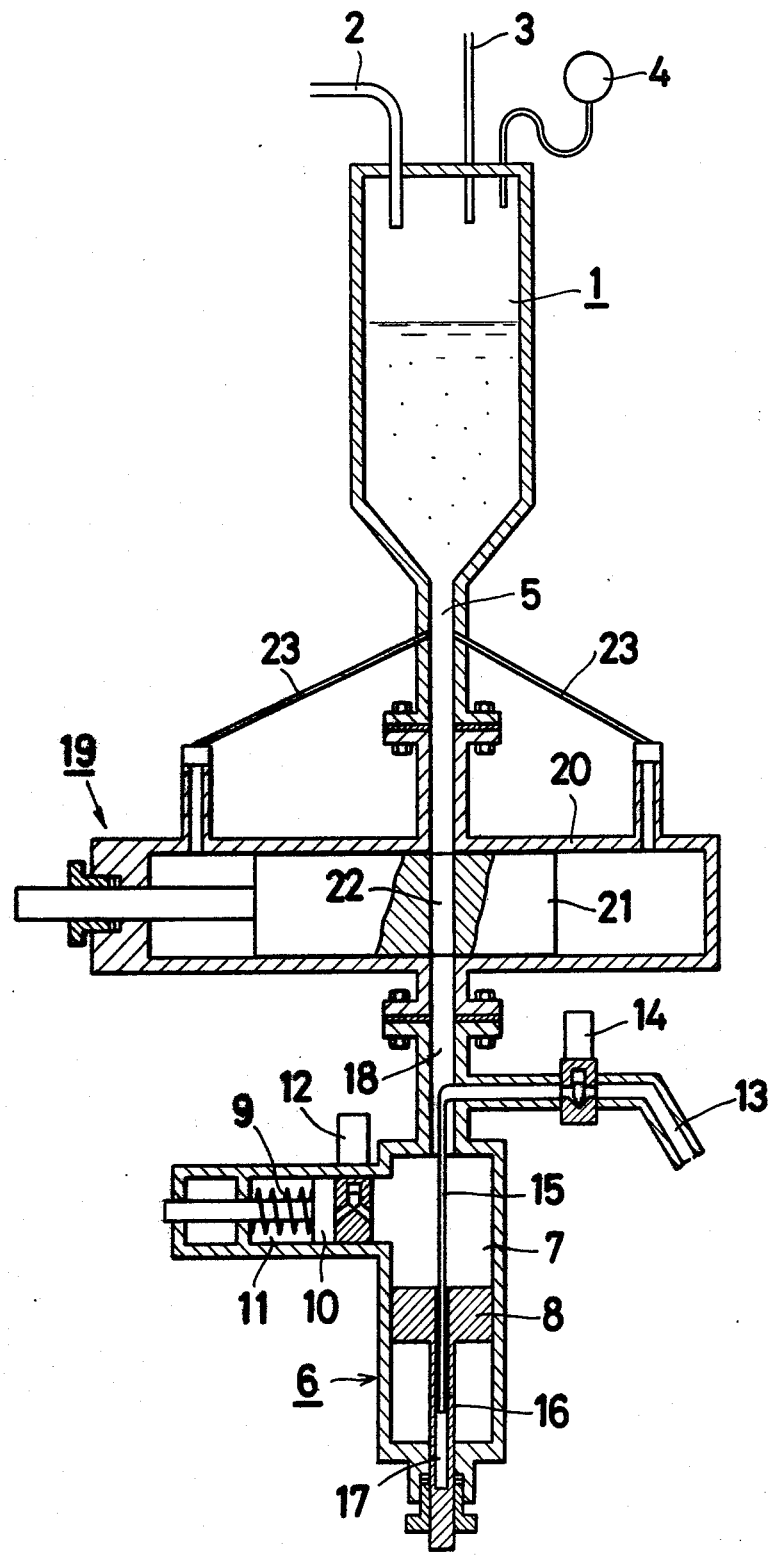

METHOD FOR DISCHARGING HIGH-PRESSURE GAS-OCCLUDING LIQUID AND DEVICE THEREFOR

BACKGROUND OF THE INVENTION

This invention relates to a method for discharging a high-pressure gas-occluding liquid from its pressureproof container in a form no longer containing said high-pressure gas into an outside space under normal pressure and to a device used for the purpose of said method.

In many high-pressure chemical reactions, there frequently arises necessity for discharging a high-pressure liquid containing a reaction product and residues from a pressureproof reaction system into an outside space under normal pressure.

Such a high-pressure liquid as described above occludes therein a high-pressure gas. When this liquid is directly discharged into an outside space under normal pressure, the ensuing pressure drop causes the gas occluded in the liquid to separate itself suddenly from the liquid. If the gas happens to be inflammable, then the impact of the sudden separation can cause unexpected trouble or the phenomenon of foaming in the liquid and consequent overflowing of the liquid out of the container. Numerous measures have so far been proposed for the prevention of these accidents. For example, there is a method whereby the liquid maintained under a high pressure is passed through one or more steps of valves to have the pressure of the liquid successively decreased. In this case, the valves undergo violent wear caused by the erosive action of the fluid and, therefore, fail to function stably for any appreciable length of time, notwithstanding they are used in conjunction with such accessorial items as spindles and valve seats specially designed for use under extremely high pressure. For this reason, there is generally adopted a batchwise method which comprises introducing a given high-pressure liquid without any change in pressure into a first high-pressure container, decreasing the pressure inside said high-pressure container and thereafter transferring the liquid of a lowered pressure, without any change in pressure, from within the first container into a second normal-pressure container.

A primary object of this invention is to provide a method which permits a high-pressure gas-containing liquid to be continuously discharged in a form no longer containing the high-pressure gas into an outside space under normal pressure more simply and easily than by any conventional method.

Another object of the present invention is to provide a device which enables a high-pressure gas-containing liquid to be continuously discharged in a form no longer containing the high-pressure gas into an outside space under normal pressure more simply and easily than by any conventional device.

SUMMARY OF THE INVENTION

To accomplish the objects described above, the method of the present invention comprises the steps of connecting a pressureproof container holding therein a high-pressure gas-containing liquid in a compressed state with a pressureproof receptacle disposed beneath said pressureproof container through the medium of a valve, then opening the intervening valve for thereby transferring the high-pressure gas-containing liquid from the pressureproof container into the pressureproof receptacle, subsequently decreasing the pressure within the pressureproof receptacle for thereby enabling the gas to be separated from the liquid and thereafter releasing the liquid in a form no longer containing the high-pressure gas from within the pressureproof into an outside space under normal pressure. The device used in this invention for effecting the method described above has, as its principal component elements, a pressureproof container for holding therein a high-pressure gas-containing liquid, a pressureproof receptacle disposed beneath said pressureproof container, a pipe for internal connection between the pressureproof container and the pressureproof receptacle, a selector valve disposed within said pipe, a piston disposed in the pressureproof receptacle and a liquid discharge pipe disposed in the pressureproof receptacle.

BRIEF DESCRIPTION OF THE DRAWING

The accompanying drawing illustrates a typical example of the device of this invention to be used for effecting the method of this invention.

DETAILED DESCRIPTION OF THE INVENTION

The present invention will be described with reference to the accompanying drawing. In the drawing, 1 denotes an air-tight pressureproof container for holding therein a high-pressure gas-occluding liquid. The high-pressure gas-occluding liquid is introduced into the interior of this container through a feed pipe 2. The gas issuing from the liquid inside the container finds its way through a connecting pipe 3 to a separate high-pressure vessel. The internal pressure of this container is displayed on a pressure gauge 4. From the bottom of the container 1, a pipe 5 extends downwardly.

By 6 is denoted a pressureproof receptacle for said high-pressure gas-occluding liquid. This receptacle is provided in the interior 7 thereof with a piston 8 adapted to be movable in the vertical direction. On one lateral side of the upper section of the interior 7, a chamber 11 which houses a free piston 10 possessed of a spring 9 and adapted for adjustment of internal pressure communicates with said interior 7. Where the chamber 11 communicates with the interior 7 of the receptacle 6, said chamber 11 is provided with a valve 12. When this valve 12 is opened, the free piston 10 is pushed and moved back by the internal pressure of the receptacle. This movement of the free piston 10 ceases where the pressure exerted by the spring 9 and the internal pressure of the receptacle are balanced. In the upper section of the interior 7 of the receptacle, there is further disposed a liquid discharging pipe 13 through a valve 14.

From the upper end of the receptacle 6, a pipe 18 extends upwardly and connects through the medium of a seatless selector valve 19 to the pipe 5 which extends downwardly from the lower end of the pressureproof container 1. In the illustrated example, the selector valve 19 comprises a cylinder 20 provided with a passage connecting the pipe 5 and the pipe 18 and a spool 21 encased within said cylinder 20 and adapted to be actuated by an external motive source. The selector valve 19 is thus illustrated as having the construction of a piston wherein said spool 21 is provided with a passage 22 which communicates with both the pipes 5 and 18. The selector valve 19 is not limited to this particular construction but may be in any desired construction insofar as it is of a seatless type. Where a piston-type selector valve is adopted, the opposite ends of the cylinder 20 may desirably be connected through routes 23, 23 with the interior or pipe 5 of the container 1 so that the pressure of the high-pressure liquid held inside the container will be applied to the interior of the cylinder to facilitate the movement of the spool 21.

Discharge of the liquid from the pressureproof receptacle can be effected smoothly when the piston and the liquid discharging pipe of the receptacle are given the constructions as illustrated in the drawing.

To be more specific, the piston 8 disposed inside the pressureproof receptacle is provided with a shaft 16 extending downwardly from the lower side thereof and a slender cylinder of unfilled space 17 opening in the upper side of the piston and extending axially inside said shaft 16.

And, a liquid pipe 15 is extended from the valve 14 of the liquid discharging pipe 13, with the extended portion of said liquid pipe 15 inserted into said cylindrical space 17. In this construction, so far as the leading end of the liquid pipe 15 in the receptacle is kept immersed in the liquid, the liquid alone can be discharged under normal pressure by opening the valve 14.

Desired withdrawal of the high-pressure gas-occluding liquid from the interior of the pressureproof container 1 is effected by closing the valves 12, 14 and 19, raising the piston 8 in the interior 7 of the receptacle and keeping it at its raised position, increasing the pressure inside the pipe 18 desirably as close to the pressure of the liquid as possible and thereafter opening the valve 19. In the case of the device illustrated, the spool 21 is actuated by an external force so as to establish communication between the passage 22 and the pipes 5, 18. At the same time, the piston 8 which is in a raised position inside the receptacle is gradually lowered by an external force, with the result that the liquid is led through the pipe 18 into the interior of the receptacle. When the total volume of the liquid admitted into the receptacle 7 and the liquid held inside the pipe 18 has reached a certain level falling short of the difference between the total inner volume of the receptacle and the volume occupied by the piston 8 (such as, for example, about 80 percent of the volume of liquid required to fill up the receptacle interior), the selector valve 19 is closed while the piston 8 is still in its descending motion. By virtue of the subsequent descent of the piston 8, the pressure of the liquid introduced via the pipe 18 into the interior of the receptacle is lowered. Then, the valve 12 is opened at the same time that the selector valve 19 is closed or while the piston 8 is still descending after the closure of said valve or after the descent of the piston 8 has terminated, with the result that the liquid exerts its pressure upon the free piston 10 and pushes and moves this free piston until the pressure is balanced with the pressure of the spring 9.

The resilient pressure of the spring 9 is adjusted to a fixed magnitude approximating normal atmospheric pressure. Consequently, the gas is released from the liquid until the pressure of the released gas builds up close to the normal atmospheric pressure. The released gas is collected in the pipe 18.

Subsequently by opening the valve 14 and consequently causing the piston 8 to ascend, the liquid rises up the liquid pipe 15 and flows out of the liquid discharging pipe 13 into an outside space under normal pressure. In this case, since the liquid pipe 15 opens into the unfilled space 17 of the piston shaft 16 so as to enable the overflowing liquid to be withdrawn to the exterior, the gas held down in position by the pressure of the spring 9 will never burst out of the system even if it is inflated in volume.

It goes without saying that, in designing the device of this invention, the relation between the amount of the high-pressure gas occluded in the liquid and the resilient pressure of the spring and the length of the overflowing pipe should be selected empirically so as to satisfy all the conditions described above.

After the whole amount of the liquid less the smallest amount required for keeping the gas from escaping out of the system has been withdrawn, the valves 12 and 14 are closed and the piston is raised to its highest possible position. Consequently, the remaining gas is compressed to an extent enough for the aforementioned operation to be repeated.

As for the gas which has collected within the pipe 18, it flows through the pipe 5 and ascends up the interior of the container 1 each time that the selector valve 19 is opened. Thus, when the valve in the feed pipe 2 is closed, the gas collects in the space above the liquid phase inside the container 1, then flows through the gas connecting pipe 3 and joins with the gas in the reaction system.

According to the present invention, therefore, a high-pressure liquid or sludge can be withdrawn in a form containing no gas into an outer space under normal pressure. This invention is characterized in that otherwise possible wear of the selector valve can be prevented because the selector valve is opened after the pressure inside the receptacle has been increased.

What is claimed is:

1. A method for discharging a high-pressure gas-occluding liquid from a pressureproof container holding therein said liquid in a compressed state into an outer space under normal pressure, which method comprises:
    (1) connecting said pressureproof container holding therein the high-pressure gas-occluding liquid in a compressed state through the medium of a valve with a pressureproof receptacle (a) disposed below said pressureproof container, (b) having a piston disposed inside said pressureproof receptacle and provided with a shaft extending downwardly from the lower side of said piston and with a slender cylinder of unfilled space opening in the upper side of said piston and extending axially in said shaft, (c) having a liquid discharging pipe disposed in said pressureproof receptacle via a valve, one end of said pipe being inserted into the cylindrical space in said piston and (d) having a free piston disposed in the upper section of said pressureproof receptacle via a valve and adapted so as to have its movement limited by means of a spring;
    (2) adjusting the internal pressure of said pressureproof receptacle to a magnitude slightly lower than the pressure within said pressureproof container by allowing the piston disposed inside said pressureproof receptacle to move upwardly;
    (3) opening the intervening valve and at the same time allowing the piston disposed inside said pressureproof receptacle to move gradually downwardly for thereby allowing the high-pressure gas-occluding liquid to transfer from said pressureproof container to the pressureproof receptacle,
    (4) closing said intervening valve while leaving unfilled space within said pressureproof receptacle;
    (5) allowing the piston disposed inside said pressureproof receptacle to further move downwardly and at the same time opening a valve adjacent to said free piston for thereby lowering the internal pressure of said pressureproof receptacle and consequently separating the gas from the liquid; and (6) opening the valve of said liquid discharging pipe and at the same time allowing the piston disposed inside said pressureproof receptacle to move upwardly for thereby releasing the liquid alone into an outer space under normal pressure.

2. A device for discharging a high-pressure gas-occluding liquid from a pressureproof container holding therein said liquid in a compressed state into an outer space under normal pressure, which device comprises said pressureproof container for holding the high-pressure gas-occluding liquid, a pressureproof receptacle disposed below said pressureproof container, a pipe connecting said pressureproof container and said pressureproof receptacle, a selector valve disposed in said pipe, a free piston disposed in the upper section of said pressureproof receptacle via a valve and adapted so as to have its movement limited by means of a spring, a piston disposed inside said pressureproof receptacle and provided with a shaft extending downwardly from the lower side thereof and a slender cylinder of unfilled space opening in the upper side of side piston and extending axially in said shaft, and a liquid discharging pipe disposed in said pressureproof receptacle via a valve and having one end inserted into the cylindrical space in the piston.

* * * * *